(12) United States Patent
Jung et al.

(10) Patent No.: US 12,744,271 B2
(45) Date of Patent: Sep. 22, 2026

(54) CYLINDRICAL SECONDARY BATTERY

(71) Applicant: Samsung SDI Co., Ltd., Yongin-si (KR)

(72) Inventors: Hyun Ki Jung, Yongin-si (KR); Byung Chul Park, Yongin-si (KR); Gun Gue Park, Yongin-si (KR); Gwan Hyeon Yu, Yongin-si (KR); Jin Young Moon, Yongin-si (KR); Kyung Rok Lee, Yongin-si (KR); Myung Seob Kim, Yongin-si (KR); Sung Gwi Ko, Yongin-si (KR); Woo Hyuk Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 849 days.

(21) Appl. No.: 18/003,714

(22) PCT Filed: Mar. 29, 2022

(86) PCT No.: PCT/KR2022/004420

§ 371 (c)(1),
(2) Date: Jun. 8, 2023

(87) PCT Pub. No.: WO2023/101107

PCT Pub. Date: Jun. 8, 2023

(65) Prior Publication Data

US 2024/0097251 A1 Mar. 21, 2024

(30) Foreign Application Priority Data

Dec. 2, 2021 (KR) ........................ 10-2021-0170922

(51) Int. Cl.
*H01M 50/186* (2021.01)
*H01M 50/107* (2021.01)
(Continued)

(52) U.S. Cl.
CPC ....... *H01M 50/186* (2021.01); *H01M 50/107* (2021.01); *H01M 50/152* (2021.01);
(Continued)

(58) Field of Classification Search
CPC ............. H01M 50/186; H01M 50/107; H01M 50/559; H01M 50/545; H01M 50/152;
(Continued)

(56) References Cited

U.S. PATENT DOCUMENTS 8,632,907 B2 1/2014 Martin et al.
2010/0266893 A1 10/2010 Martin et al.
(Continued)

FOREIGN PATENT DOCUMENTS

CN 201066701 Y * 5/2008 .......... H01M 50/102
CN 203166010 U 8/2013
(Continued)

OTHER PUBLICATIONS

English translation of Search Report for PCT/KR2022/004420. (Year: 2022).*

(Continued)

*Primary Examiner* — Patricia L. Hailey
(74) *Attorney, Agent, or Firm* — Womble Bond Dickinson (US) LLP

(57) ABSTRACT

An embodiment of the present invention relates to a cylindrical secondary battery in which a positive electrode terminal is adhered and fixed to a cylindrical can by an insulating sheet, and thus sealing between the cylindrical can and the positive electrode terminal can be facilitated due to an increased contact area. Disclosed in an embodiment is a cylindrical secondary battery comprising an electrode assembly that has a positive electrode plate, a separator, and a negative electrode plate, a cylindrical can that has the electrode assembly accommodated therein and a lower end
(Continued)

thereof open, and is electrically connected to the negative electrode plate, a positive electrode terminal that penetrates the upper surface of the cylindrical can to be electrically connected to the positive electrode plate, a cap plate that seals the lower end of the cylindrical can, and an insulation sheet that adheres the lower part of the positive electrode terminal to the lower surface of the upper surface part of the cylindrical can to seal the inside of the cylindrical can.

12 Claims, 5 Drawing Sheets

(51) Int. Cl.

| | |
|---|---|
| ***H01M 50/152*** | (2021.01) |
| ***H01M 50/179*** | (2021.01) |
| ***H01M 50/184*** | (2021.01) |
| ***H01M 50/197*** | (2021.01) |
| ***H01M 50/198*** | (2021.01) |
| ***H01M 50/545*** | (2021.01) |
| ***H01M 50/559*** | (2021.01) |
| ***H01M 50/564*** | (2021.01) |
| ***H01M 50/588*** | (2021.01) |
| ***H01M 50/593*** | (2021.01) |

(52) U.S. Cl.
CPC ....... *H01M 50/179* (2021.01); *H01M 50/184* (2021.01); *H01M 50/197* (2021.01); *H01M 50/198* (2021.01); *H01M 50/545* (2021.01); *H01M 50/559* (2021.01); *H01M 50/564* (2021.01); *H01M 50/588* (2021.01); *H01M 50/593* (2021.01)

(58) Field of Classification Search
CPC ............. H01M 50/564; H01M 50/198; H01M 50/184; H01M 50/179; H01M 50/197; H01M 50/588; H01M 50/593
USPC .......................................................... 429/174
See application file for complete search history.

(56) References Cited

U.S. PATENT DOCUMENTS

| | | | | |
|---|---|---|---|---|
| 2023/0079718 A1* | 3/2023 | Ko | ...................... | H01M 50/213<br>429/99 |
| 2024/0113401 A1* | 4/2024 | Ko | ...................... | H01M 50/179 |
| 2024/0274933 A1* | 8/2024 | Moon | ................. | H01M 50/566 |
| 2025/0015402 A1* | 1/2025 | Choi | ................... | H01M 50/533 |
| 2025/0260143 A1* | 8/2025 | Ko | ...................... | H01M 50/559 |

FOREIGN PATENT DOCUMENTS

| | | | | | |
|---|---|---|---|---|---|
| CN | 211654873 U | * | 10/2020 | ............ | H01M 10/04 |
| JP | 11-067279 A | | 3/1999 | | |
| JP | H1167279 A | * | 3/1999 | ............ | H01M 10/05 |
| KR | 10-0880657 B1 | | 1/2009 | | |
| KR | 10-1038115 B1 | | 5/2011 | | |
| KR | 10-1737644 B1 | | 5/2017 | | |
| KR | 10-2019-0093360 A | | 8/2019 | | |
| KR | 10-2021-0114863 A | | 9/2021 | | |
| KR | 20210114863 A | * | 9/2021 | .......... | H01M 50/147 |

OTHER PUBLICATIONS

English translation of Written Opinion for PCT/KR2022/004420. (Year: 2022).*

International Search Report for PCT/KR2022/004420 dated Sep. 6, 2022, 3 pages.

* cited by examiner

CYLINDRICAL SECONDARY BATTERY

CROSS-REFERENCE TO RELATED APPLICATION(S)

This application is a U.S. National Phase Patent Application of International Application No. PCT/KR2022/004420, filed on Mar. 29, 2022, which claims priority to Korean Application No. 10-2021-0170922, filed Dec. 2, 2021, the entire content of each of which is incorporated herein by reference.

TECHNICAL FIELD

Various embodiments of the present invention relate to a cylindrical secondary battery.

BACKGROUND ART

In general, a cylindrical secondary battery includes a cylindrical electrode assembly, a cylindrical can accommodating the electrode assembly and electrolyte, and a cap assembly coupled to an upper opening of the can to seal the can and electrically connected to the electrode assembly to serve as a means for electrically connecting the electrode assembly to an external component.

Cylindrical secondary batteries generally have a structure in which a can having a negative polarity and a cap having a positive polarity are insulated from each other by means of a gasket. In the case of a battery module used by connecting a plurality of cylindrical secondary batteries, it is necessary to connect busbars to upper and lower parts of a secondary battery, respectively, making the structure complicated and increasing the processing time.

The above information disclosed in this Background section is only for enhancement of understanding of the background of the invention and therefore it may contain information that does not constitute prior art.

DESCRIPTION OF EMBODIMENTS

Technical Problem

The present invention provides a cylindrical secondary battery in which a positive electrode terminal is adhered and fixed to a cylindrical can by an insulating sheet, and thus sealing between the cylindrical can and the positive electrode terminal can be facilitated due to an increased contact area.

In addition, in the present invention, since a positive electrode terminal is fixed to a cylindrical can by means of an adhesive through an insulating sheet, mechanical processing for fixing the positive electrode terminal can be eliminated, thereby simplifying the process and reducing costs.

In addition, the present invention provides a cylindrical secondary battery in which a busbar connection structure can be simplified because, by providing both a negative electrode and a positive electrode on the upper surface, only the upper surfaces are connected when electrically connecting a plurality of cylindrical secondary batteries through busbars.

Solution to Problem

A cylindrical secondary battery according to an embodiment of the present invention may include: an electrode assembly that has a positive electrode plate, a separator, and a negative electrode plate, a cylindrical can that has the electrode assembly accommodated therein and a lower end thereof open, and is electrically connected to the negative electrode plate, a positive electrode terminal that penetrates the upper surface of the cylindrical can to be electrically connected to the positive electrode plate, a cap plate that seals the lower end of the cylindrical can, and an insulation sheet that adheres the lower part of the positive electrode terminal to the lower surface of the upper surface part of the cylindrical can to seal the inside of the cylindrical can.

The positive electrode terminal may include a terminal plate that is in the shape of a circular plate attached to the lower surface of the upper surface part by the insulation sheet, and a terminal pillar that protrudes upward from the center of the terminal plate and protrudes to the outside of the cylindrical can through a terminal hole of the upper surface part.

In the terminal pillar, a diameter positioned in the terminal hole of the cylindrical may be equal to a diameter of a portion exposed to the outside of the cylindrical can.

The cylindrical secondary battery may further include a first gasket interposed between the terminal hole of the cylindrical can and the terminal pillar to block electrical connection between the cylindrical can and the terminal pillar and contacting the insulation sheet.

The terminal plate may further include a groove formed in a downward direction on an upper surface, and the insulation sheet may be filled in the groove.

The upper surface part of the cylindrical may further include a groove formed in an upper direction on a lower surface, and the insulation sheet may be filled in the groove.

The insulation sheet may include a first sheet made of an insulating material, and a second sheet covering one surface of the first sheet and the other surface opposite to the first sheet and melted by heat to have an adhesive component.

In the first sheet of the insulation sheet, one surface may be adhered to the lower surface of the upper surface part by the second sheet, and the other surface may be adhered to the positive electrode terminal by the second sheet.

The terminal pillar may include a cavity formed to have a depth from an upper surface to a lower direction.

The terminal pillar may have a thickness of 0.5 mm to 2 mm in a region where the cavity is formed.

The cap plate may be electrically separated from the cylindrical can by a second gasket and may be non-polar.

Advantageous Effects of Disclosure

In the cylindrical secondary battery according to various embodiments of the present invention, since a positive electrode terminal is adhered and fixed to a cylindrical can by means of an insulation sheet, sealing between the cylindrical can and the positive electrode terminal can be facilitated due to an increased contact area.

In addition, in the cylindrical secondary battery of the present invention, since a positive electrode terminal is fixed to a cylindrical can by means of an adhesive through an insulating sheet, mechanical processing for fixing the positive electrode terminal can be eliminated, thereby simplifying the process and reducing costs.

In addition, in the cylindrical secondary battery of the present invention, since both a negative electrode and a positive electrode are provided on the upper surface, when electrically connecting a plurality of cylindrical secondary batteries through busbars, only upper surfaces need to be connected, and thus a busbar connection structure can be simplified.

BEST MODE

Figure 1:
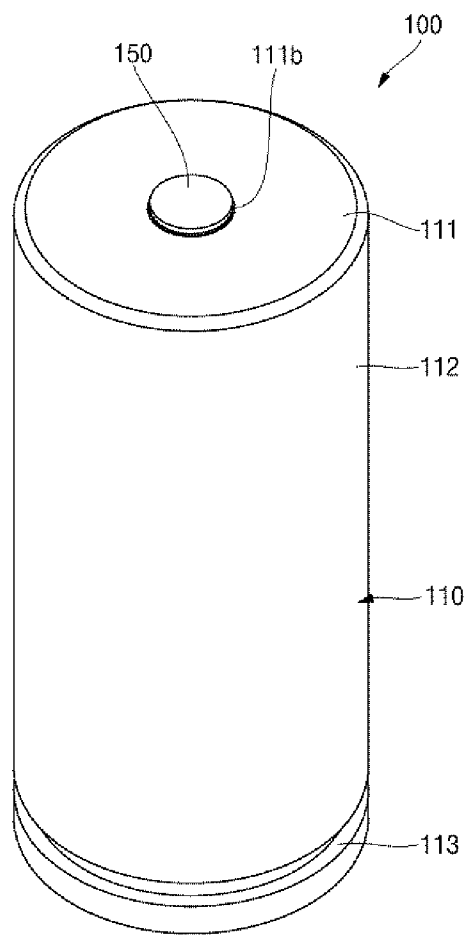
FIG. 1 is a perspective view showing a cylindrical secondary battery according to various embodiments of the present invention.

Hereinafter, preferred embodiments of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity, and like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

The preferred embodiments of the present invention will be described in detail with reference to the accompanying drawings to the extent that a person skilled in the art can easily practice the present invention.

Here, the same reference numerals are assigned to parts having similar configurations and operations throughout the specification. In addition, when a part is said to be electrically coupled to another part, this includes not only a case where it is directly connected but also a case where it is connected with another element interposed therebetween.

Figure 2:
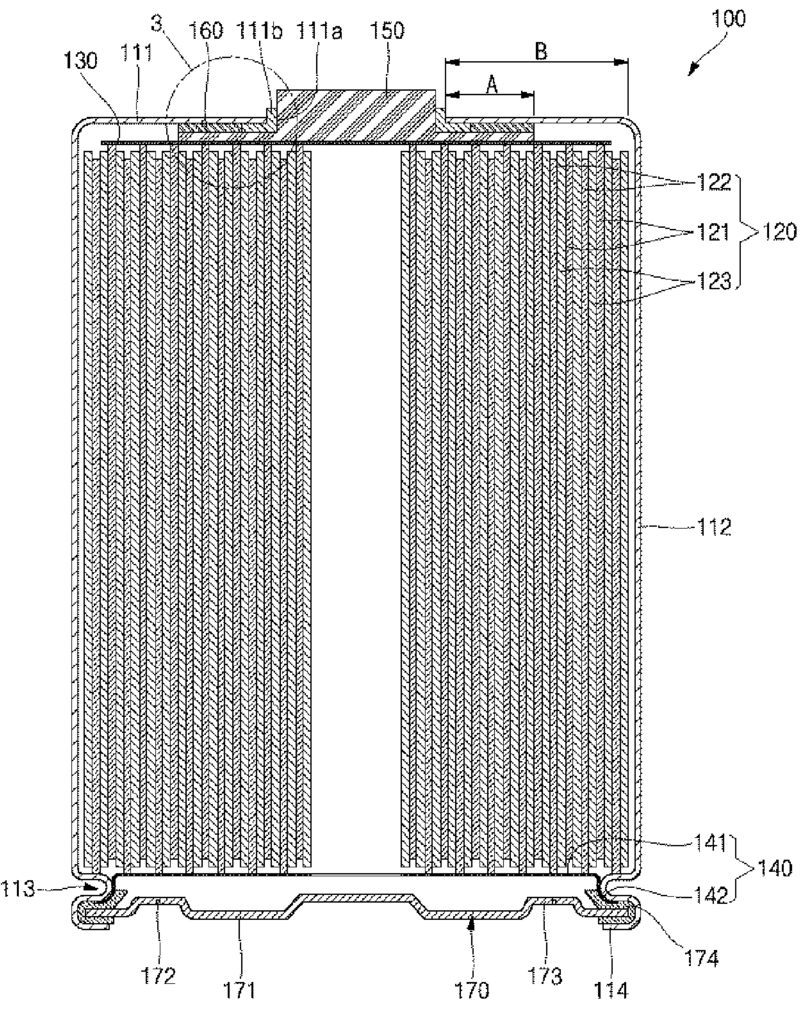
FIG. 2 is a cross-sectional view of the cylindrical secondary battery shown in FIG. 1.
Figure 3:
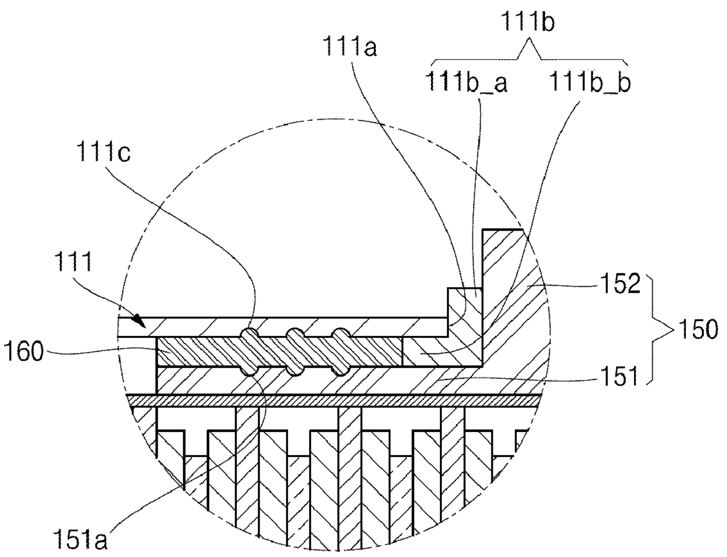
FIG. 3 is an enlarged cross-sectional view showing three portions of the cylindrical secondary battery in FIG. 2.

FIG. 1 is a perspective view showing a cylindrical secondary battery 100 according to various embodiments of the present invention. FIG. 2 is a cross-sectional view of the cylindrical secondary battery 100 shown in FIG. 1. FIG. 3 is an enlarged cross-sectional view showing three portions of the cylindrical secondary battery 100 in FIG. 2.

As shown in FIGS. 1 to 3, the cylindrical secondary battery 100 according to the present invention may include a cylindrical can 110, an electrode assembly 120 accommodated inside the cylindrical can 110, a positive electrode terminal 150 coupled to a terminal hole provided at one end of the cylindrical can 110, and a cap plate 170 sealing an opening of the other end of the cylindrical can 110.

The cylindrical can 110 includes a circular upper surface part 111 and a side part 112 extending a predetermined length downward from an edge of the upper surface part 111. The upper surface part 111 and the side part 112 of the cylindrical can 110 may be integrally formed.

The circular upper surface part 111 may have a flat circular plate shape and may include a terminal hole 111*a* penetrating the center. The upper surface part 111 may be inserted into and coupled to the terminal hole 111*a*, and thus the positive electrode terminal 150 passes therethrough. A first gasket 111*b* for sealing and electrical insulation may be further interposed between the terminal hole 111*a* and the positive electrode terminal 150. In addition, an insulation sheet 160 may be further interposed between the upper surface part 111 and the positive electrode terminal 150. The first gasket 111*b* and the insulation sheet 160 may electrically separate the positive electrode terminal 150 and the cylindrical can 110 from each other by blocking a contact therebetween. The terminal hole 111*a* of the cylindrical can 110 may be sealed by the first gasket 111*b*. The first gasket 111*b* may be made of an insulating material. In more detail, the first gasket 111*b* may be made of a resin material such as polyethylene (PE), polypropylene (PP), or polyethylene terephthalate (PET).

During the manufacturing process of the cylindrical secondary battery 100, the lower part of the cylindrical can 110 is opened. Therefore, in the cylindrical secondary battery

100, the electrode assembly 120 may be inserted through the open lower part of the cylindrical can 110 together with the electrolyte during the manufacturing process. At this time, the electrolyte and the electrode assembly 120 may be inserted into the cylindrical can 110 in a state in which the opened lower part faces the upper part. After the electrolyte solution and the electrode assembly 120 are inserted into the cylindrical can 110, the cap plate 170 is coupled to the opened lower end to seal the inside of the cylindrical can 110. Here, the electrolyte serves to allow lithium ions to move between the positive electrode plate 121 and the negative electrode plate 122 constituting the electrode assembly 120. The electrolyte may be a non-aqueous organic electrolyte solution that is a mixture of a lithium salt and a high-purity organic solvent. In addition, the electrolyte may be a polymer using a polymer electrolyte or a solid electrolyte, but the type of electrolyte solution is not limited herein.

The cylindrical can 110 may be made of steel, a steel alloy, aluminum, an aluminum alloy, or an equivalent thereof, but the material is not limited thereto. In addition, in order to prevent the electrode assembly 120 from escaping to the outside, a beading part 113 and a crimping part 114 may be formed in the cylindrical can 110, the beading part 113 being inwardly recessed on the cap plate 170 and the crimping part 114 being inwardly bent under the cap plate 170.

After the electrode assembly 120 is inserted through the open lower end of the cylindrical can 110, the beading part 113 is formed to prevent the electrode assembly 120 from being separated from the cylindrical can 110. An edge of the lower surface of the electrode assembly 120 may be seated on the beading part 113 and come into contact with the beading part 113.

The electrode assembly 120 includes a positive electrode plate 121 coated with a positive electrode active material, a negative electrode plate 122 coated with a negative electrode active material, and a separator 123 interposed between the positive electrode plate 121 and the negative electrode plate 122 to prevent a short between the positive electrode plate 121 and the negative electrode plate 122 and to allow only the movement of lithium ions. After the positive electrode plate 121, the negative electrode plate 122, and the separator 123 are stacked, the electrode assembly 120 is wound from the winding end to have a substantially cylindrical shape. In addition, in the electrode assembly 120, a positive electrode uncoated portion that is not coated with the positive electrode active material may upwardly protrude from the positive electrode plate 121, and a negative electrode uncoated portion that is not coated with the negative electrode active material may downwardly protrude from the negative electrode plate 122.

In the positive electrode plate 121, a positive electrode active material made of a transition metal oxide is coated on at least one surface of a positive electrode current collector plate, which is a plate-shaped metal foil made of aluminum (Al). In addition, in the positive electrode plate 121, the positive electrode uncoated portion that is not coated with a positive electrode active material may be provided at an upper portion thereof. The positive electrode uncoated portion may upwardly protrude from the electrode assembly 120. That is, the positive electrode uncoated portion of the positive electrode plate 121 may upwardly protrude more than the negative electrode plate 122 and the separator 123.

In the negative electrode plate 122, a negative electrode active material such as graphite or carbon is coated on at least one surface of a negative electrode current collector plate, which is a plate-shaped metal foil made of copper (Cu) or nickel (Ni). In addition, in the negative electrode plate 122, a negative electrode uncoated portion that is not coated with a negative electrode active material may be provided at a lower portion thereof. The negative electrode uncoated portion may downwardly protrude from the electrode assembly 120. That is, the negative electrode uncoated portion of the negative electrode plate 122 may downwardly protrude more than the positive electrode plate 121 and the separator 123.

The separator 123 may be made of polyethylene (PE) or polypropylene (PP), but the present invention is not limited thereto. The separator may prevent an electrical short between the positive electrode plate 121 and the negative electrode plate 122 and allow only the movement of lithium ions.

The positive electrode current collector plate 130 may be a circular metal plate having a shape corresponding to the upper surface of the electrode assembly 120. A plane size of the positive electrode current collector plate 130 may be equal to or smaller than a size of an upper surface of the electrode assembly 120. The positive electrode current collector plate 130 may be made of aluminum (Al). The positive electrode current collector plate 130 may be fixed and electrically connected to the positive electrode plate 121 exposed on the upper surface of the electrode assembly 120 by welding in a state in which the lower surface thereof is in contact with the upper surface of the electrode assembly 120. The positive electrode current collector plate 130 may be fixed and electrically connected to the positive electrode terminal 150 by welding in a state in which the upper surface is in contact with the lower surface of the positive electrode terminal 150. The positive electrode current collector plate 130 serves as a passage for current flow between the positive electrode plate 121 of the electrode assembly 120 and the positive electrode terminal 150.

The negative electrode current collector plate 140 may include a circular flat part 141 corresponding to the lower surface of the electrode assembly 120 and an extension part 142 extending downward from an edge of the flat part 141. The upper surface of the flat part 141 may be in contact with the lower surface of the electrode assembly 120. The upper surface of the flat part 141 may be fixed and electrically connected to the negative electrode plate 122 exposed to the lower side of the electrode assembly 120 by welding in a state of being in contact with the lower surface of the electrode assembly 120.

The extension part 142 may include a plurality of extension parts to be spaced apart from each other along the edge of the flat part 141. The extension part 142 may be bent to extend downward from the edge of the flat portion 141. In addition, the extension part 142 may be in contact with the inner surface of the beading part 113. Here, the inner surface may be the inner surface of the cylindrical can 110. The extension part 142 may be welded in a state of being in contact with the inner surface of the beading part 113, and may be fixed and electrically connected to the cylindrical can 110. Accordingly, the negative electrode current collector plate 140 serves as a current flow path between the negative electrode plate 122 of the electrode assembly 120 and the cylindrical can 110.

The positive electrode terminal 150 may be inserted into a terminal hole 111*a* provided in the upper surface part 111 of the cylindrical can 110 and electrically connected to the positive electrode current collector plate 130. The positive electrode terminal 150 may be made of the same or similar material as the positive electrode current collector plate 130 and the positive electrode plate 121. In the positive electrode terminal 150, a diameter located inside the cylindrical can 110 may be larger than a diameter of a portion exposed to an upper portion of the cylindrical can 110.

The positive electrode terminal 150 may include a terminal plate 151 located inside the cylindrical can 110 and a columnar terminal pillar 152 protruding upward from the center of the upper surface of the terminal plate 151. Here, the terminal plate 151 may be in the shape of a flat circular plate and may be interposed between the upper surface part 111 of the cylindrical can 110 and the positive electrode current collector plate 130. Of course, an insulation sheet 160 for electrical insulation and sealing may be further interposed between the upper surface part 111 of the cylindrical can 110 and the terminal plate 151.

In addition, the terminal pillar 152 may be in a substantially cylindrical shape, and may be shaped to correspond to the terminal hole 111*a* of the cylindrical can 110. That is, the diameter of the terminal pillar 152 located in the terminal hole 111*a* of the cylindrical can 110 may be the same as the diameter of the portion exposed to the top of the cylindrical can 110.

After the terminal pillar 152 is coupled to the terminal hole 111*a* of the upper surface part 111 of the cylindrical can 110 from the bottom to the top, the positive electrode terminal 150 may be coupled to the cylindrical can 110 by thermal fusion processing. Of course, a first gasket 111*b* may be interposed between the terminal pillar 152 and the terminal hole 111*a*. The first gasket 111*b* may be in the shape of a circular ring corresponding to the terminal hole 111*a*. The first gasket 111*b* may include a first region 111*b_a* interposed between the terminal pillar 152 and the terminal hole 111*a* and a second region 111*b_b* bent to extend from the lower end of the first region 111*b_a* to be interposed between the upper surface part 111 of the cylindrical can 110 and the terminal plate 151. The second area 111*b_b* of the first gasket 111*b* may come into contact with the insulation sheet 160. Here, the second region 111*b_b* may be a region in which the elastic first gasket 111*b* protrudes due to pressurization when the positive electrode terminal 150 is coupled to the terminal hole 111*a*.

The terminal plate 151 of the positive electrode terminal 150 may be located below the upper surface part 111 of the cylindrical can 110. The terminal plate 151 of the positive electrode terminal 150 and the upper surface part 111 of the cylindrical can 110 may be heated and pressed in a state in which the insulation sheet 160 is interposed therebetween, to then be adhered and sealed.

Figure 4:
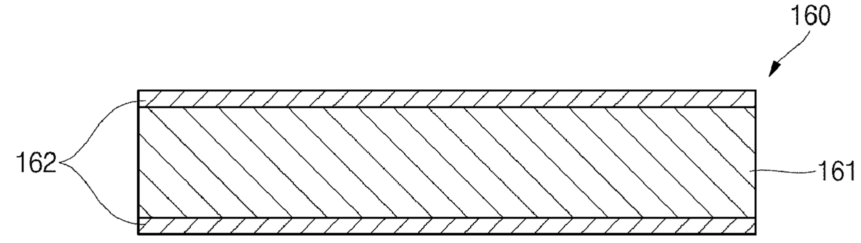
FIG. 4 is a cross-sectional view of an insulation sheet of the cylindrical secondary battery shown in FIG. 1.

As shown in FIG. 4, the insulation sheet 160 has a certain thickness and may include a first sheet 161 made of an insulating material and a second sheet 162 that is melted by heat and has an adhesive component, while covering one surface of the first sheet 161 and the other surface opposite to the one surface. The thickness of the first sheet 161 is preferably greater than that of the second sheet 162. In addition, the insulation sheet 160 may be in the shape of a circular plate corresponding to the upper surface part 111 of the cylindrical can 110. Preferably, the insulation sheet 160 may have a plane size smaller than or equal to a plane size of the upper surface part 111 of the cylindrical can 110. In addition, the plane size of the insulation sheet 160 may be greater than or equal to a plane size of the terminal plate 151. The insulation sheet 160 may adhere the cylindrical can 110 and the positive electrode terminal 150 to each other and may electrically insulate the same. That is, the insulation sheet 160 may prevent electrical connection between the cylindrical can 110 and the positive electrode terminal 150.

In addition, since the positive electrode terminal 150 and the cylindrical can 110 are adhered to each other by means of the insulation sheet 160, sealing between the cylindrical can 110 and the positive electrode terminal 150 may be facilitated by an increased contact area.

In addition, in the insulation sheet 160, a through hole 160*a* penetrating between the upper and lower surfaces may be formed in a region located below the terminal hole 111*a* of the cylindrical can 110. The terminal pillar 152 may pass through the through hole 160*a* of the insulation sheet 160 and be inserted into the terminal hole 111*a* of the cylindrical can 110.

In the insulation sheet 160, the first sheet 161 may include at least one of polypropylene (PP), polybutylene terephthalate (PBT), polyethylene terephthalate (PET), polyurethane foam association (PFA), poly tetra fluoroethylene (PTFE), fluororesin, and phenolic resin (bakelite) them. The second sheet 162 may be poly ethylene (PE) or maleic anhydride polypropylene (PP-MA).

Figure 5:
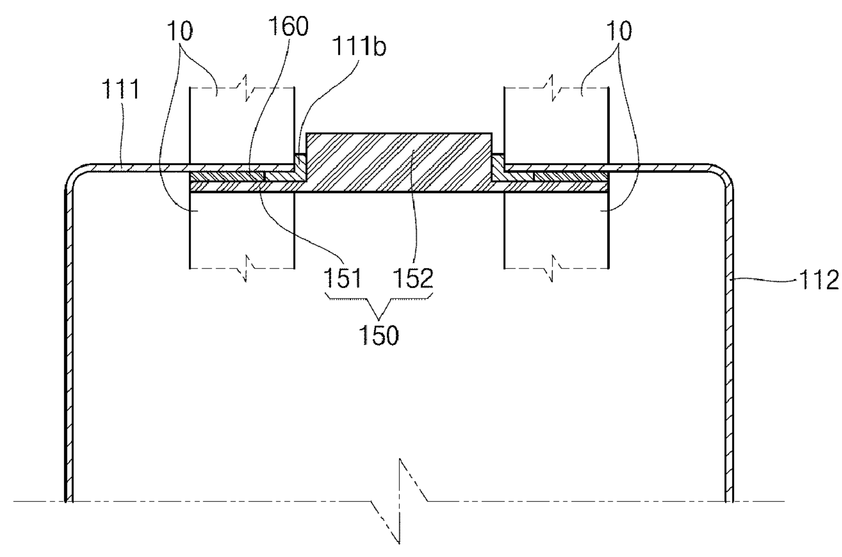
FIG. 5 is a cross-sectional view showing an example of a coupling process between a cylindrical can and a positive electrode terminal in a cylindrical secondary battery.

In an example, as shown in FIG. 5, when a thermal fusion jig 10 heats and presses a portion the terminal plate 151 and the upper surface part 111 of the cylindrical can 110, the terminal plate 151 and the upper surface part 111 of the cylindrical can 110 are adhered to each other by the insulation sheet 160. That is, the second sheet 162 of the insulation sheet 160 is melted, so that the upper surface of the first sheet 161 and the upper surface part 111 of the cylindrical can 110 are adhered to each other, and then adhered to the bottom surface of the first sheet 161 and the terminal plate 151. That is, the upper surface part 111 of the cylindrical can 110 and the terminal plate 151 may be adhered and sealed by the insulation sheet 160. Here, a first length A, which is a cross-sectional length of the upper surface part 111 of the cylindrical can 110 and the terminal plate 151, which are coupled by the insulation sheet 160, is preferably greater than ⅕ and less than 1 of a second length B, which is a cross-sectional length of the upper surface part 111 of the cylindrical can 110. Here, when the first length A is smaller than ⅕ of the second length B, sealing between the cylindrical can 110 and the positive electrode terminal 150 may not be facilitated. Here, the first and second lengths A and B may be radii excluding the terminal hole 111*a* and the through hole 160*a*.

As described above, in the positive electrode terminal 150, the terminal plate 151 is adhered and coupled to the upper surface part 111 of the cylindrical can 110 through the insulation sheet 160, so that the adhesion area can be increased by the size of the insulation sheet 160, and thus sealing may be facilitated.

Additionally, the terminal plate 151 of the positive electrode terminal 150 may further include a groove 151*a* on the upper surface, and the upper surface part 111 of the cylindrical can 110 may further include a groove 111*c* on the lower surface. The grooves 111*c* and 151*a* may further improve adhesion with respect to the insulation sheet 160. That is, when the insulation sheet 160 is pressed in a state of being interposed between the terminal plate 151 of the positive electrode terminal 150 and the upper surface part 111 of the cylindrical can 110, the grooves 111*c* and 151*a* are filled, and thus the adhesion may be improved by the increased contact area. Although the grooves 111*c* and 151*a* are shown in forms of semicircular slits, the shapes thereof are not limited in the present invention and may be changed in various manners.

In the positive electrode terminal 150, the terminal plate 151 may be electrically connected to the positive electrode current collector plate 130 by welding. Preferably, after the positive electrode current collector plate 130 is inserted into the cylindrical can 110 in a state of being coupled to the electrode assembly 120, the positive electrode current collector plate 130 may be welded to the bottom surface of the terminal plate 151 through a space in the center of the electrode assembly 120. The positive electrode terminal 150 may be electrically connected to the positive electrode plate 121 of the electrode assembly 120 through the positive electrode current collector plate 130.

The cap plate 170 is a circular metal plate and may be coupled to the lower end of the cylindrical can 110. The cap plate 170 is coupled to the lower end of the cylindrical can 110 in a state in which a second gasket 174 is interposed between the cap plate 170 and the lower end of the cylindrical can 110, thereby preventing the cap plate 170 from being electrically connected to the cylindrical can 110. By not being electrically connected to the positive electrode or the negative electrode of the electrode assembly 120, the cap plate 170 may not have a separate electrical polarity.

In a state in which the edge of the cap plate 170 is seated on the lower part of the beading part 113 of the cylindrical can 110, the cap plate 170 may be fixed by forming the crimping part 114 at the lower end of the cylindrical can 110. More specifically, the cap plate 170 may be seated under the beading part 113 of the cylindrical can 110 in a state in which the second gasket 174 is interposed therebetween. Of course, the cap plate 170 may be seated under the negative electrode current collector plate 114 coupled to the beading part 113 in a state in which the second gasket 174 is interposed therebetween. Thereafter, the crimping part 114 of the cylindrical can 110 is bent toward the inside of the cap plate 160 to press the second gasket 174, and thus the cap plate 170 and the cylindrical can 110 may be coupled to each other. Here, the second gasket 174 may also be interposed between the end of the extension part 142 of the negative electrode current collector plate 140 and the cap plate 170.

The cap plate 170 may include at least one protrusion 171 protruding downward. As an example, the protrusion 171 of the cap plate 170 may be spaced apart from the center and protrude downward to have a ring shape on a plane. As another example, the protruding portion 171 of the cap plate 170 may protrude downward to have a plurality of patterns. The cap plate 170 may include a protrusion 171 to support internal pressure of the cylindrical can 110. In addition, the lower surface of the protrusion 171 of the cap plate 170 may be positioned higher than the lower surface of the crimping part 114 of the cylindrical can 110. That is, the crimping part 114 of the cylindrical can 110 may protrude more downward than the protrusion 171 of the cap plate 170. Accordingly, when the cylindrical secondary battery 100 is placed on a flat surface, the crimping part 114 of the cylindrical can 110 may contact the surface, and the protrusion 171 of the cap plate 170 may be spaced apart from the surface. In addition, since the crimping part 114 of the cylindrical can 110 protrudes more downward than the protrusion 171 of the cap plate 170, even when the cap plate 170 expands due to the internal pressure of the cylindrical can 110, the cap plate 170 can be prevented from being in contact with one surface. Therefore, the cylindrical secondary battery 100 can maintain the overall height even when the internal pressure of the cylindrical can 110 increases. In addition, since irregularities are provided by the protrusions 171, the cap plate 170 can withstand the internal pressure even when the internal pressure of the cylindrical can 110 increases.

In addition, the cap plate 170 has a notch 172 formed therein, and thus can be opened by a set pressure. When the internal pressure of the cylindrical can 110 exceeds a rupture pressure, the notch 172 is ruptured to prevent the cylindrical secondary battery 100 from exploding. That is, when excessive internal pressure is generated inside the cylindrical can 110, the notch 172 is ruptured, so that the excessive internal pressure can be discharged. The notch 172 of the cap plate 170 may be spaced apart from the center and may have a ring shape in a plan view. As another example, the notch 172 may be formed to have a plurality of patterns, and the shape of the notch 172 is not limited in the present invention.

The second gasket 174 may be made of a resin material such as polyethylene (PE), polypropylene (PP), or polyethylene terephthalate (PET). The second gasket 174 may press and seal a portion between the cylindrical can 110 and the cap plate 170 and prevent the cap plate 170 from being separated from the cylindrical can 110.

In the cylindrical secondary battery 100, the positive electrode terminal 150 and the cylindrical can 110 are adhered and sealed through the insulation sheet 160, and thus sealing power can be improved and the manufacturing process can be simplified.

Figure 6:
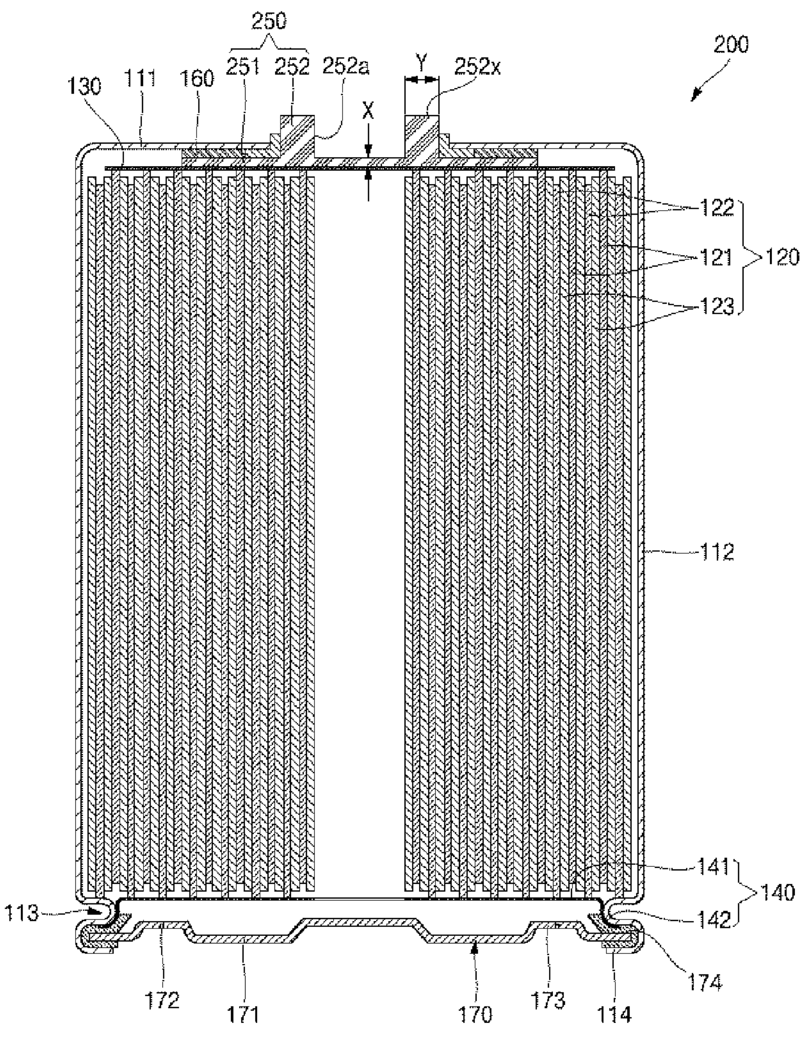
FIG. 6 is a cross-sectional view showing a cylindrical secondary battery according to various embodiments of the present invention.

Referring to FIG. 6, a cross-sectional view showing a cylindrical secondary battery 200 according to various embodiments of the present invention is shown. The cylindrical secondary battery 200 according to the present invention may include a cylindrical can 110, an electrode assembly 120 accommodated inside the cylindrical can 110, a positive electrode terminal 250 coupled to a terminal hole provided at one end of the cylindrical can 110, and a cap plate 170 sealing an opening at the other end of the cylindrical can 110. Of course, the positive electrode terminal 150 may be electrically connected to the electrode assembly 120 through a positive electrode current collector plate 130, and the cylindrical can 110 may be electrically connected to the electrode assembly 120 through a negative electrode current collector plate 140. In addition, the positive electrode terminal 250 may be coupled to the cylindrical can 110 through an insulation sheet 160. In addition, the positive electrode terminal 250 may include a terminal plate 151 located inside the cylindrical can 110 and a columnar terminal pillar 252 protruding upward from the center of the upper surface of the terminal plate 151.

In the cylindrical secondary battery 200, the cylindrical can 110, the electrode assembly 120, the positive electrode current collector plate 130, the negative electrode current collector plate 140, the terminal plate 151 of the positive electrode terminal 150, the insulation sheet 160, and the cap plate 160 may be similar to those of the cylindrical secondary battery 100 shown in FIGS. 1 to 3.

Hereinafter, the cylindrical secondary battery 200 will be described mainly with respect to the terminal pillar 252 of the positive electrode terminal 250 which is a different feature from the cylindrical secondary battery 100.

The terminal pillar 252 may have a substantially cylindrical shape, and may be shaped to correspond to the terminal hole 111*a* of the cylindrical can 110. In addition, a cavity 252*a* having a predetermined depth may be formed in the terminal pillar 252 from the top to the bottom. By forming the cavity 252*a* in the terminal pillar 252, the terminal pillar 252 may be welded to the positive electrode current collector plate 130 from the outside of the cylindrical can 110.

In the terminal pillar 252, a first thickness X, which is a thickness of a region where the cavity 252*a* is formed, may be smaller than thicknesses of other regions. Here, the first thickness X is preferably any one of 0.5 mm to 2 mm. Here, when the first thickness (X) is greater than 2 mm, it may not be easy to weld the terminal pillar 252 and the positive electrode current collector plate 130 from the outside of the cylindrical can 110. In addition, when the first thickness X is smaller than 0.5 mm, it may be difficult to maintain the rigidity of the terminal pillar 252.

In addition, in the terminal pillar 252, an upper surface length Y, which is a cross-sectional length of an upper surface 252*x*, is preferably greater than 5 mm and smaller than 10 mm. When the upper surface length Y of the terminal pillar 252 is smaller than 5 mm, welding may not be facilitated due to lack of area when an external connection means such as a busbar is connected to the upper surface of the terminal pillar 252. In addition, when the length Y of the upper surface of the terminal pillar 252 is greater than 10 mm, it is not easy to insert a welding means into the cavity 252*a* due to a reduced plane size of the cavity 252*a*, making it impossible to weld the positive electrode terminal 150 and the cylindrical can 110. Here, the upper surface length Y may be a radius of the terminal pillar 252 excluding the cavity 252*a*.

In the cylindrical secondary battery 200, welding of the positive electrode terminal 150 and the positive electrode current collector plate 130 may be performed from the outside through the cavity 252*a* provided in the positive electrode terminal 150.

What has been described above is only one embodiment for carrying out the cylindrical secondary battery of the present invention, and the present invention is not limited to the above-described embodiment. However, the technical spirit of the present invention lies in that anyone skilled in the art could make various changes, as claimed in the claims below, without departing from the gist of the present invention.

INDUSTRIAL APPLICABILITY

Various embodiments of the present invention relate to a cylindrical secondary battery.

The invention claimed is:

1. A secondary battery comprising:

an electrode assembly that has a positive electrode plate, a separator, and a negative electrode plate;

a cylindrical can that has the electrode assembly accommodated therein and a lower end thereof open, and is electrically connected to the negative electrode plate;

a positive electrode terminal that penetrates an upper surface part of the cylindrical can to be electrically connected to the positive electrode plate;

a cap plate that seals the lower end of the cylindrical can; and an insulation sheet between a lower part of the positive electrode terminal and a lower surface of the upper surface part of the cylindrical can, the insulation sheet including a first sheet of a first material, the insulation sheet further including a second sheet on a first surface of the first sheet and on a second surface of the first sheet opposite to the first surface, wherein the second sheet is of a second material different from the first material, wherein a first portion of the second sheet on the first surface is adhered to the lower surface of the upper surface part and a second portion of the second sheet on the second surface is adhered to the lower part of the positive electrode terminal to seal the inside of the cylindrical can.

2. The secondary battery of claim 1, wherein the positive electrode terminal comprises: a terminal plate that is in a shape of a circular plate attached to the lower surface of the upper surface part by the insulation sheet; and a terminal pillar that protrudes upward from the center of the terminal plate and protrudes to the outside of the cylindrical can through a terminal hole of the upper surface part.

3. The secondary battery of claim 2, wherein in the terminal pillar, a diameter positioned in the terminal hole of the cylindrical can is equal to a diameter of a portion exposed to the outside of the cylindrical can.

4. The secondary battery of claim 2, further comprising a first gasket interposed between the terminal hole of the cylindrical can and the terminal pillar to block electrical connection between the cylindrical can and the terminal pillar and contacting the insulation sheet.

5. The secondary battery of claim 4, wherein the cap plate is electrically separated from the cylindrical can by a second gasket and is non-polar.

6. The secondary battery of claim 2, wherein the terminal plate further includes a groove formed in a downward direction on an upper surface, and the insulation sheet is filled in the groove.

7. The secondary battery of claim 2, wherein the terminal pillar includes a cavity formed to have a depth from an upper surface to a lower direction.

8. The secondary battery of claim 7, wherein the terminal pillar has a thickness of 0.5 mm to 2 mm in a region where the cavity is formed.

9. The secondary battery of claim 1, wherein the upper surface part of the cylindrical can further includes a groove formed in an upper direction on a lower surface, and the insulation sheet is filled in the groove.

10. The secondary battery of claim 1, wherein the second sheet is designed to be melted by heat to have an adhesive component.

11. The secondary battery of claim 10, wherein adhering of the first and second portions of the second sheet causes fixing of the positive electrode terminal to the cylindrical can.

12. The secondary battery of claim 1, wherein the first material includes an insulating material and the second material includes an adhesive material.

* * * * *